United States Patent
Navarro Madrid

(10) Patent No.: US 10,254,412 B2
(45) Date of Patent: Apr. 9, 2019

(54) DEVICE AND METHOD FOR COMPUTING AN ERROR BOUND FOR A KALMAN FILTER BASED GLOBAL NAVIGATION SATELLITE SYSTEM (GMSS) POSITION

(71) Applicant: GMV AEROSPACE AND DEFENCE, S.A., Madrid (ES)

(72) Inventor: Pedro Francisco Navarro Madrid, Madrid (ES)

(73) Assignee: GMV AEROSPACE AND DEFENCE, S.A., Madrid (ES)

( * ) Notice: Subject to any disclaimer, the term of this patent is extended or adjusted under 35 U.S.C. 154(b) by 477 days.

(21) Appl. No.: 14/885,642

(22) Filed: Oct. 16, 2015

(65) Prior Publication Data
US 2016/0109579 A1    Apr. 21, 2016

(30) Foreign Application Priority Data
Oct. 16, 2014 (EP) .................................. 14189240

(51) Int. Cl.
*G01S 19/39* (2010.01)
(52) U.S. Cl.
CPC .................................. *G01S 19/39* (2013.01)
(58) Field of Classification Search
CPC ........... G01S 19/39; G01S 19/42; G01S 19/20
See application file for complete search history.

(56) References Cited

U.S. PATENT DOCUMENTS

2008/0270027 A1* 10/2008 Stecko .................... G01S 19/20
701/476
2009/0273515 A1* 11/2009 Azaola Saenz ......... G01S 19/42
342/357.27

FOREIGN PATENT DOCUMENTS

EP    2081042 A2 * 7/2009 ............. G01S 19/20

OTHER PUBLICATIONS

J. Rife et al., Paired Overbounding for Nonideal LAAS and WAAS Error Distributions, IEEE Transactions on Aerospace and Electronic Systems, vol. 42(4), Oct. 2006 (Year: 2006).*
G. Dai et al., Energy Efficient Lossy Data Aggregation in Asynchronous Sensor Networks, Sixth International Conference on Mobile Ad-hoc and Sensor Networks, 2010 (Year: 2010).*
H. Zhu et al., A variational Bayesian approach to robust sensor fusion based on Student-t distribution, Information Sciences, vol. 221, p. 201-214, Feb. 2013 (Year: 2013).*
Kalman Filter. (2001). Hargrave's Communications Dictionary, Wiley. Hoboken, NJ: Wiley. Retrieved from https://search.credoreference.com/content/entry/hargravecomms/kalman_filter/0 (Year: 2001).*

* cited by examiner

*Primary Examiner* — Bernarr E Gregory
*Assistant Examiner* — Fred H Mull

(57) ABSTRACT

The invention relates to a method for computing a bound B up to a given confidence level $1-\alpha$, of an error in a state vector estimation KSV of a state vector TSV of a physical system as provided by a Kalman filter. The method decomposes the errors of the Kalman solution as a sum of the errors due to each of the measurement types used in the filter, In addition, the contribution of each type of measurement is bounded by a multivariate t-distribution that considers the error terms from all the epochs processed. Then, the method implements three main operations:
  computing a probability distribution of the measurement errors for each epoch and measurement type;
  summing the previous distributions to obtain a global distribution that models the Kalman solution error; and
  computing the error bound B for a given confidence level from the resulting distribution.

19 Claims, No Drawings

DEVICE AND METHOD FOR COMPUTING AN ERROR BOUND FOR A KALMAN FILTER BASED GLOBAL NAVIGATION SATELLITE SYSTEM (GMSS) POSITION

FIELD OF THE INVENTION

The present invention arose in the field of satellite-based navigation (or GNSS), but it is applicable in many fields in which Kalman filtering is used. The invention gives response to the need for reliable bounds to the position and velocity errors in a variety of applications of GNSS navigation, ranging from civil aviation to electronic (road) fee collection, among others.

BACKGROUND OF THE INVENTION

The GNSS navigation problem is the problem of estimating the position of a GNSS user by means of the information provided by the GNSS signal as received by a GNSS user receiver.

There are several standard GNSS navigation techniques, the most common of which is absolute navigation. In absolute navigation, the navigation system computes its absolute position and velocity with no more information than that contained in the GNSS satellite signals tracked by the user's receiver, by means of so-called pseudo-range and Doppler measurements. For that purpose, in order to be able to obtain its position some additional parameters must be estimated, as the receiver clock bias and drift. If more than one satellite constellation is processed (e.g. GPS+GLONASS), it is also necessary to add an inter-system bias that accounts for the different synchronization of the satellite clocks. Position, velocity and the auxiliary parameters are simultaneously estimated in a common Kalman filter.

GNSS navigation can also profit from the use of the data from an inertial measurement unit, or IMU, which usually consists of a 3-axis accelerometer and a 3-axis gyroscope. The GNSS+IMU tightly coupled Kalman filter substitutes the propagation model of the GNSS-only Kalman filter by a mechanization stage, which uses the data from the IMU to predict the filter state throughout the time period between successive GNSS data epochs. This hybrid filter requires the inclusion of new parameters in the Kalman state vector, namely, the accelerometer and gyro biases, plus the attitude matrix variables.

Finally, it is possible to perform absolute navigation with centimeter-level errors by using a technique called PPP (Precise Point Positioning). PPP processes pseudorange and carrier-phase measurements from a single user receiver, using detailed physical models and corrections, and requires precise satellite orbits and clocks products (e.g. through real-time corrections to the navigation message). PPP is different from other precise-positioning approaches like RTK in that no reference stations are needed in the vicinity of the user receiver. The only observation data that must be processed are measurements from the user receiver. In terms of the Kalman filter, the main difference of PPP with respect to the standard GNSS navigation is that a carrier-phase ambiguity parameter must be estimated for each satellite.

The present invention is applicable in the GNSS stand-alone, GNSS+IMU and PPP cases.

For many applications of GNSS navigation a certain level of accuracy is not enough. In addition, the system must also provide reliability. For instance, in a tolling system users should always be charged for all and only the toll roads they use (no more, no less). In other fields of application, as aviation, the consequences of getting a wrong position beyond certain limits and not being aware of it are much more dramatic. This can be solved, in the case of a GNSS-based system, by adding a method of navigational integrity. Integrity provides the necessary guarantee that users are where they are supposed to be (i.e. where the navigation system says they are). A system can preserve integrity and at the same time be inaccurate, as long as the system itself is aware of the lack of accuracy. In such a case, the problem is that the system may be unavailable more often than desired. A perfect system (from the point of view of its reliability) would exhibit 100% availability and 100% integrity. Unfortunately, perfect systems do not exist, and in practice there is always a trade-off between both goals.

Many methods of integrity use the concept of Protection Level (PL), which intends to provide bounds to the GNSS positioning errors up to certain level of confidence. For instance, for a given confidence level $1-\alpha$, a valid Protection Level is a positive number B such that:

$$P(|\delta|>B)<\alpha$$

where P is the probability operator and $|\delta|$ is the norm of the position error. Usual values of the confidence level $\alpha$ range from $10^{-4}$ to $10^{-7}$, and depend on the requirements of the GNSS application. For instance, $\alpha=10^{-7}$ appears frequently in the aviation context. Note that there are many possible values that fulfil the Protection Level condition, but it is important that the method provides fairly small ones, so that the availability is not degraded. In the case of GNSS navigation, the concept of error bound is usually particularized to a subset of the position coordinates, especially the vertical component $\delta_U$ (e.g. civil aviation) or the horizontal ones, in the North and East directions ($\delta_E, \delta_N$), (e.g. electronic road fee collection).

This concept of Protection Level arose as the core of the GNSS Integrity concept that was developed for Satellite Based Augmentation Systems (SBAS), such as the American WAAS or the European EGNOS among others, and has been applied specifically to those systems as well as to Ground Based Augmentation Systems (GBAS) such as LAAS. Both SBAS and GBAS are systems that provide real time corrections and integrity information applicable to GNSS observations. Civil aircrafts equipped with special GNSS navigation units can receive those corrections and apply them to their GNSS observations, as well as the integrity information, in the form of statistical bounds to the observation errors that remain after applying the corrections. Thus the on-board GNSS unit can achieve a more accurate estimate of its position (thanks to corrections) and, moreover, can compute a Protection Level for the remaining position error.

Besides, autonomous methods for computing a Protection Level have been defined in the frame of the so-called RAIM methods (Receiver Autonomous Integrity Monitoring). By autonomous it is meant that they do not depend on corrections or any extra information coming from an augmentation system such as a SBAS or a GBAS. The RAIM concept aims to provide an integrity layer to the GNSS navigation process, implementing techniques for detecting and isolating faulty measurements (that is, measurements with excessive error) along with the mentioned Protection Levels for statistically bounding the position estimation error. Such PL computation methods are, however, difficult to justify from a theoretical point of view, since they rely on hypotheses that rarely hold in real world.

Patent document EP2113786 discloses an autonomous method to provide Protection Levels for GNSS positioning based on navigation residuals, which does not make any hypothesis about the statistical behaviour of the errors of the individual measurements, but it is based on only one hypothesis (isotropy) that such measurement errors combine in an error vector which can point in any direction (of the measurement space) with the same probability.

All the methods to compute Protection Levels that have been mentioned above only apply to the least-squares estimation. A method to compute Protection Levels for a Kalman solution faces new requirements:

- The filter makes use of different types of measurements (e.g. pseudoranges, Doppler and carrier-phase measurements in the GNSS case).
- The filter combines observations from different epochs, giving more weight to the most recent ones. In addition, the measurement noise is not white noise, as the Kalman filter usually assumes. Instead, measurements performed in successive epochs show a temporal correlation (coloured noise) that may have an important (negative) impact in the accuracy of the Kalman solution. So, it is crucial that the method to compute the Protection Levels takes into account the effects of temporal correlations.
- The Kalman solution has errors coming from the propagation of the solution between different updates, which should also be quantified.
- The size of the Kalman state vector may become quite big, but usually only a few of the estimated parameters are interesting.

Multivariate t-distributions can be used to model different error distributions. The family is parameterized by a scalar $N_m$, which is called the number of degrees of freedom, and a covariance matrix $R_m$, which gives an estimation of the size of the errors. Thus, the distribution of an error vector $\theta$ of dimension d reads:

$$\theta \sim \mathcal{T}_d(N_m, R_m) = \frac{\Gamma[(n+d)/2]}{\Gamma(n/2) N_m^{d/2} \pi^{d/2} |R_m|^{1/2}} \cdot \left[1 + \frac{1}{N_m} \theta^T R_m^{-1} \theta\right]^{-(N_m+d)/2} \quad [\text{Eq. 1}]$$

The t-distribution is heavy tailed and it provides a more realistic representation of the measurement and navigation errors than the normal distribution. It has been used in order to improve the robustness of navigation filters against outliers. It provides a good model for the measurement errors, which is used in a Bayesian framework (see, for instance, "*A New Approach for Improving Reliability of Personal Navigation Devices under Harsh GNSS Signal Conditions*", Anup Dhital, Jared B. Bancroft and Gérard Lachapelle, *Sensors*, November 2013, 13, 15221-15241).

The following paragraphs provide a summary of the Kalman filter and sets up the notation that will be used later. The Kalman filter estimates the value at successive epochs of a set of parameters (state vector), by using the information of the measurements that arrive sequentially. The measurements are processed in a sequential way, providing a new solution every time a new set of observations are received. The filter proceeds by updates of its main variables:

$x_k$, the state vector, or vector of parameters defining the state at time or epoch $t_k$;

$P_k$, the covariance matrix of the estimated parameters at time $t_k$;

It performs two different types of updates:

A. Time Update ("Propagation"):

The filter propagates the state vector and covariance matrix from epoch k−1 to epoch k; their value after this update is usually noted $x_k^-$, $P_k^-$. The filter models the stochastic behaviour of the parameters between successive epochs. In the linear setting—which is enough for most purposes—the state and covariance propagation is given by:

$$x_k^- = F_k x_{k-1}$$

$$P_k^- = F_k P_{k-1} F_k^T + Q_k$$

where:

$F_k$ is the transition matrix from time $t_{k-1}$ to $t_k$; and,
$Q_k$ is the covariance matrix of the random process ("process noise") that drives the evolution of the parameters of the state vector.

In the hybrid filter, the propagation of the state and its covariance matrix is performed by a mechanization algorithm that processes the IMU data received. For most purposes, this update can be considered as equivalent to the linear update.

B. Measurements Update:

The second update uses the information provided by the measurements to correct the state vector and covariance matrix, and gives their final value at epoch $t_k$, noted $x_k$ and $P_k$, respectively. The value of the measurements vector at epoch k can be written as $$z_k = h(x_k) + v_k$$

Function h gives the dependence of the measurements on the parameters, and $v_k$ is the measurement noise, assumed to have a covariance matrix $R_k$. The estimation is based on the linearized expression:

$$z_k = H_k^T x_k + v_k$$

The matrix $H_k$ is usually known as the design matrix (also called observation matrix). The measurements update can be performed through the following steps:

The measurements are reconstructed to obtain the residuals vector $y_k$;

The new covariance matrix $P_k$ is computed as follows:

$$P_k = (H_k^T W_k H_k + (P_k^-)^{-1})^{-1}$$

where $W_k = R_k^{-1}$ is the weight matrix of the measurements at epoch k.

The normal equations are solved:

$$\Delta x_k = P_k H_k^T W_k y_k$$

so that $x_k = x_k^- + \Delta x_k$.

There are other mechanizations of the sequential filter, which are mathematically equivalent, but the one described above is preferred to present the integrity algorithm. For reasons of clarity, in the rest of the document the ubiquitous subscript k will be dropped. The design and weight matrix will be decomposed in the blocks corresponding to each measurement type m, noted as $H_m$, $W_m$ respectively, as shown in the following diagrams:

$$H = \begin{pmatrix} H_{m1} \\ \vdots \\ H_{mk} \end{pmatrix}, W = \begin{pmatrix} W_{m1} & \cdots & 0 \\ \vdots & \ddots & \vdots \\ 0 & \cdots & W_{mk} \end{pmatrix}$$

Finally, it is important to discuss the influence of the temporal correlations of the measurements in the performance of the filter. The Kalman filter as presented above is optimal under the assumption that the measurements taken at different epochs are uncorrelated. However, this is seldom the case. Usually, the measurement process is repeated at each epoch and give a constant number of measurements (say w), with an associated noise vector $v_k$ of size w. The noise is assumed to have zero mean: $E(v_k)=0$. The temporal correlation matrices can be defined as $B(k,l)=E(v_k v_l^T)$. The noise process is called stationary if $B(k,l)=B(k+s,l+s)=B(k-l)$. In the case of the white noise, the measurements at different epochs are not correlated, and then $B(k,l)=0$ if $k \neq l$. In most cases the correlation matrix B is diagonal, and each component of the vector $v_k$ can be analysed as a one-dimensional process. In one dimension we can define the autocorrelation function:

$$R(k,l) = \frac{B(k,l)}{B(k,k)^{1/2} B(l,l)^{1/2}}$$

If the process is stationary, the autocorrelation function is simpler and may be written as:

$$R(k,l) = \rho(k-l)$$

The function $\rho$ verifies the following inequalities:

$$0 \leq \rho(h) \leq 1$$

Then, the diagonal correlation matrix B of a stationary process will be:

$$B(h) = \begin{pmatrix} \rho_1(h) & \cdots & 0 \\ \vdots & \ddots & \vdots \\ 0 & \cdots & \rho_w(h) \end{pmatrix}, 0 \leq \rho_i(h) \leq 1$$

In the simplest case, a Gauss-Markov process, the autocorrelation function is given by:

$$\rho(h) = \varphi^{|h|}, 0 \leq \varphi \leq 1$$

For values of $\rho(h)$ significantly above 0, the filter performance is clearly degraded. So, it is very important to take into account the effect of correlations to compute bounds for the Kalman solution errors. In the method of the present invention, when for a measurement type m the temporal correlations are considered, we will denote by $\rho_m$ the associated correlation matrix B(1) of the measurement noise. This matrix will be given as an input to the method. Its values will be derived either from the knowledge of the measurement device characteristics or by any independent method that estimates them from the evolution of the measurements and their residuals.

As far as the present invention is concerned, the actual form of the non-linear GNSS observation equation or how the design matrix H is derived from it, are not relevant topics, so the present document does not go deeper into such details (which, on the other hand, are of standard use in GNSS Kalman filter navigation and can be learned from many GNSS literature sources as, for instance, "*Global Positioning System: Theory & Applications*", Bradford W. Parkinson & James J. Spilker (editors), 1996).

DESCRIPTION OF THE INVENTION

The present invention refers to a device for computing an error bound of a Kalman filter based GNSS position solution. The present invention also relates to a method for computing an error bound of a Kalman filter based GNSS according to the embodiments of the device and of the method disclosed herein.

The present invention provides a robust and consistent device for autonomously computing Protection Levels for a Kalman filter, based on simple hypotheses.

The device and method of the present invention do not rely on restrictive hypothesis on the behaviour of the measurements noise. It uses the residuals of the measurements of a given type, at a given epoch, to estimate the magnitude of their typical error.

The invention refers to a device and to a method for computing a bound B up to a given confidence level $1-\alpha$, of an error in a Kalman state vector estimation KSV which is an estimation of a state vector TSV (comprising a set of parameters) of a physical system as provided by a Kalman filter. The Kalman filter receives from the physical system multiple raw measurements $RM_m$ of different types, m denoting each measurement type. The Kalman filter also provides:

the number $n_{OBS,m}$ of raw measurements of type m;
a design matrix $H_m$ for measurements of type m;
a weight matrix $W_m$ used for measurements of type m;
the vector of residuals $y_m$ of the measurements of type m, computed after the Kalman measurements update;
a covariance matrix P of the error made in the estimation KSV of the state vector;
a transition matrix F defining the evolution of the state vector.

In general, in order to estimate the parameters which form the state vector TSV, the Kalman state vector KSV contains additional parameters that are not in the state vector TSV; the bound applies only to the subset of parameters of KSV that are an estimation of TSV.

According to the invention, the device computes a t-distribution $T_{G,m}$ for each measurement type m, each t-distribution $T_{G,m}$ being defined by a scalar $N_{G,m}$ and a matrix $R_{G,m}$ of the same size as the state vector KSV. It corresponds to the errors in the state vector estimation KSV due to errors in the measurements of type m, accumulated during the Kalman process.

In addition, the device and method computes a correlation state $A_m$ of the measurements errors of each measurement type m with the errors of the state vector. The correlation state is defined by a matrix containing a row for each measurement and a column for each parameter of the state vector estimation KSV, representing the expected degree of correlation between measurements and estimated parameters.

The values of $T_{G,m}$ and $A_m$ are updated according to each Kalman update of the state vector, by performing four steps:

The first step involves computing a t-distribution $T_{L,m}$ that corresponds to the projection into the state vector estimate KSV of the errors of the measurements of type m in the current epoch. As expected, $T_{L,m}$ is defined by a scalar $N_{L,m}$ and a matrix $R_{L,m}$.

In the second step, $T_{G,m}$ is propagated to the new epoch.

Then, $T_{G,m}$ is updated by combining $T_{L,m}$ with the previous value of $T_{G,m}$, by using a fitting module MERGE which also takes into account the correlation state $A_m$.

Finally, the correlation state $A_m$ is also updated.

These steps are described in the next paragraphs.

The distribution $T_{L,m}$ depends on a characterization of the quality of the measurements that is produced in a dedicated module, which characterization consists of two scalar parameters $n_m$ and $r_m$ that represent a t-distribution modelling the measurement error size, and a scalar $\rho_m$ that measures the temporal correlations. The value of these parameters should be delivered continuously, as the characteristics of the environment may change very quickly. A dedicated module, called OBS_QUALITY, will be in charge of producing $n_m$, $r_m$ and $\rho_m$ based on indicators from the Kalman process or from the physical system itself (e.g. a GNSS receiver).

In a preferred embodiment of the invention the OBS_QUALITY module is based on the residuals statistics provided by the Kalman process: n, is determined by the number of raw measurements $n_{OBS,m}$ minus the effective number of parameters estimated by the Kalman filter $d_{eff}$ and $r_m$ is the weighted RMS of the measurement residuals divided by $n_m$, where $d_{eff}$ is defined as the trace of the matrix $H_m K_m$ and $K_m = PH_m^T W_m$ is the Kalman gain matrix. Finally, $\rho_m$ is a configuration parameter.

From the characterization of the quality of the measurements given by $n_m$ and $r_m$, the distribution $T_{L,m}$ defined by a scalar $N_{L,m}$ and a matrix $R_{L,m}$ is obtained through the relations $N_{L,m}=n_m$ and $R_{L,m}=(r_m^2 K_m W_m^{-1} K_m^T)$, where $K_m$ is the Kalman gain matrix.

The propagation of $T_{G,m}$ to the current epoch is based on the Kalman propagation, by keeping $N_{G,m}$ unchanged and replacing the matrix $R_{G,m}$ by $(UR_{G,m}U^T)$, where $U=(1-\Sigma_m K_m H_m) \cdot F$.

In order to combine $T_{L,m}$ and $T_{G,m}$, the device comprises a MERGE module that adjusts a new t-distribution to the sum of two input t-distributions $T_1$ and $T_2$, with a given cross-correlation matrix D. Considering correlations is very important, as it has a big impact in the errors accumulated in the Kalman solution. The MERGE module must provide an effective way of combining $T_1$ and $T_2$, so that the error bounds computed later are realistic.

Once $T_{G,m}$ is available for each measurement type m, the bound B is then computed for a given confidence level $1-\alpha$ by:
i) computing an error bound $B_m$ from $T_{G,m}$ for each measurement type m and adding all the error bounds $B_m$; or,
ii) merging the different $T_{G,m}$ into a single set of parameters T by using the MERGE module and computing a bound B from T.

The computation of a bound for a given confidence level $1-\alpha$ from a t-distribution T is delivered by a dedicated module, of which the preferred embodiments are presented below.

That is, the present invention provides a device and method for computing an error bound (or Protection Level), up to a given confidence level $1-\alpha$, to a subset of the parameters estimated by a Kalman filter.

According to the invention, the device and method decompose the errors of the Kalman solution as a sum of the errors due to each of the measurement types used in the filter. In addition, the contribution of each type of measurement is in turn the sum of error terms from all the epochs processed. Then, the computation of the error bound is the result of three main operations:

Compute a probability distribution of the measurement errors for each epoch and measurement type.
Sum the previous distributions to obtain a global distribution that models the Kalman solution error, preferably taking into account the temporal correlations of the measurements as indicated below.
Compute the error bounds for a given confidence level from the resulting distribution.

In the particular case of GNSS navigation, these parameters are preferably the position coordinates, or their horizontal or vertical components; or the horizontal and/or the vertical components of the velocity error.

The measurements may proceed from different sources: in the present case they can be GNSS pseudorange, Doppler or carrier-phase observations. In the case of a hybrid filter, IMU sensors readings are also processed, although they are applied in the propagation phase, and not in the Kalman update.

The fitting module MERGE which adjusts a new t-distribution T to the sum of two input t-distributions $T_1$ and $T_2$ with cross-correlation matrix D preferably comprises calculating the defining parameters N and R of T as follows:
$R=R_1+R_2+D+D^T$; and,
N by numerically solving the following equation:

$$N^{(d-2)/2}t^{2-d}(1+t^{-2})^{-(N+d-2)/2} = N_1^{(d-2)/2}t_1^{N_1}\exp\left\{\frac{(N_1+N_2)N_1}{2N_2}t_2^2\right\} + N_2^{(d-2)/2}t_2^{N_2}\exp\left\{\frac{(N_1+N_2)N_2}{2N_1}t_1^2\right\}$$

where:
d is the size or the number of parameters of the state vector TSV,
$t_1=[N_1 tr(R_1)/tr(S)]^{1/2}$
$t_2=[N_2 tr(R_2)/tr(S)]^{1/2}$
$t=[N tr(R)/tr(S)]^{1/2}$
$S=N_1 R_1+N_2 R_2+Z$
$Z=\omega \cdot (N_1 R_1+N_2 R_2)$, $\omega$ being a fine tuning parameter that depends on the confidence level $1-\alpha$ of interest ($\omega$ in the range 1-3 for small confidence levels, $\omega \sim 10$ for high confidence levels).

In another preferred embodiment of the invention, the fitting method which adjusts a new t-distribution T to the sum of two input t-distributions $T_1$ and $T_2$ with cross-correlation matrix D calculating the defining parameters N and R of T as follows:

$$R = R_1 + R_2 + D + D^T; \text{ and,}$$

$$N = tr(R) \cdot [\omega \cdot (a_1 + a_2) + 4a_1 a_2] \cdot \left[\omega \cdot \left(\frac{a_1}{N_1} + \frac{a_2}{N_2}\right) + 4\frac{a_1 a_2}{N_1 + N_2}\right]^{-1}$$

where $\alpha_1=tr(R_{m1})$, $\alpha_2=tr(R_{m2})$ and $\omega$ is a fine tuning parameter that depends on the confidence $1-\alpha$ of interest; again $\omega$ in the range 1-3 for small confidence levels, $\omega \sim 10$ for high confidence levels.

According to a preferred embodiment, a partial error bound $B_m$ for a t-distribution $T_{G,m}$ can be computed as follows:
$$B_m(\alpha) = k(\alpha, N_{G,m}) \cdot b_m$$
where:
$k(\alpha, N_{G,m})$ is computed by numerically solving the equation $$\frac{2}{B(d/2, N_{G,m}/2)} \int_k^\infty \frac{y^{d-1}}{(1+y^2)^{(N_{G,m}+d)/2}} dy = \alpha$$

d is the size of the state vector TSV,
$b_m=[\tau_m/d]^{1/2}$,
$\tau_m$ is the trace of $R_m$ taken over the d parameters of the state vector TSV, ($N_{G,m}$, $R_{G,m}$) are the defining parameters of the t-distribution $T_{G,m}$.

In another preferred embodiment, $k(\alpha, N)$ is computed as $$\left(\frac{dN}{2}\right)^{1/2} \cdot ((\alpha)^{-2/N} - 1)^{1/2}.$$

In a particular embodiment the matrices $R_{L,m}$, $R_{G,m}$, $A_m$ can be simplified to numbers and the method is adapted in the following steps:

$R_{L,m}$ is determined by $R_{L,m} = r_m^2 \cdot [\text{tr}(K_m W_m^{-1} K_m^T)/d]$,
$R_{G,m}$ is propagated as $\lambda^2 \cdot R_{G,m}$, where $\lambda = \text{tr}(U)/d$,
The correlation matrix $D_m$ is determined by $R_{L,m}^{1/2} \cdot A \cdot A_m$,
$A_m$ as the sum of $\rho_m R_{L,m}^{1/2}$ and $\rho_m A_m \lambda$
the traces being taken over the d parameters of the state vector TSV.

In a particular embodiment, if the Kalman filter also provides estimates of the time derivatives of the state vector TSV, the matrices $R_{L,m}$, $R_{G,m}$ are 2×2 matrices and $A_m$ is a two-dimensional vector, and the method is adapted in the following steps:

$R_{L,m}$ is determined by $$R_{L,m} = \begin{pmatrix} \mu_{m,A} & \mu_{m,C} \\ \mu_{m,C} & \mu_{m,B} \end{pmatrix},$$

$\mu_{m,A} = r_m^2 \cdot [\text{tr}_{PP}(K_m W_m^{-1} K_m^T)/d]$,
$\mu_{m,C} = r_m^2 \cdot [\text{tr}_{PV}(K_m W_m^{-1} K_m^T)/d]$,
$\mu_{m,B} = r_m^2 \cdot [\text{tr}_{VV}(K_m W_m^{-1} K_m^T)/d]$,
$\text{tr}_{PP}$ is the trace over the block of the matrix whose rows and columns correspond to parameters of TSV, $\text{tr}_{VV}$ is the trace over the block of the matrix whose rows and columns correspond to time derivatives of parameters of TSV and $\text{tr}_{PV}$ is the trace over the block of the matrix whose rows correspond to parameters of TSV and whose columns correspond to time derivatives of parameters of TSV;
$R_{G,m}$ is propagated as $\overline{U} R_{G,m} \overline{U}^T$, where $$\overline{U} = \frac{1}{d}\begin{pmatrix} \text{tr}_{PP}(U) & \text{tr}_{PV}(U) \\ \text{tr}_{VP}(U) & \text{tr}_{VV}(U) \end{pmatrix};$$

The correlation matrix $D_m$ is determined by $\overline{U} A_m (\mu_{m,A}^{1/2} \mu_{m,B}^{1/2})$,
$A_m$ is updated as the sum of $\rho_m (\mu_{m,A}^{1/2} \mu_{m,B}^{1/2})^T$ and $\rho_m \overline{U} A_m$, In a particular embodiment of the invention, the device and method of the invention have the capability to add information about some of the error sources provided by an external interface, in a unified manner. An additional measurement label is included to consider errors in a set of parameters X not estimated in the Kalman filter but affecting the measurements. For this new label X, the device and method are adapted in that:

the output of the OBS_QUALITY module is provided by an external interface;
the associated Kalman inputs are determined as a weight matrix $W_X$ provided by an external interface and a design matrix $H_X$ computed as $W_X^{-1} \Sigma_m J_m^T W_m H_m$, where the sum runs over the measurement types m, and $J_m$ is the design matrix containing the dependence of measurements of type m on the set of parameters X.

The different aspects and embodiments of the invention defined in the foregoing can be combined with one another, as long as they are compatible with each other.

Additional advantages and features of the invention will become apparent from the detail description that follows and will be particularly pointed out in the appended claims.

DETAILED DESCRIPTION OF THE PREFERRED EMBODIMENTS

The present invention provides a device and a method for computing an error bound (or Protection Level), up to a given confidence level $1-\alpha$, to a subset of the parameters estimated by a Kalman filter. In the particular case of GNSS navigation, these parameters are the position coordinates, or their horizontal or vertical components. As defined above, an error bound for a confidence level $1-\alpha$ is a positive number B such that:

$$P(|\delta| > B) < \alpha$$

where $|\delta|$ is the norm of the error vector of the parameters under consideration.

The device is coupled to the Kalman filter in the following way. After each measurement update, the filter provides a new parameter solution (e.g. new position and velocity, plus new values of the auxiliary parameters, in the GNSS navigation case). Then, the device computes a new bound for the subset of parameters that are being monitored. As input, it requires the current state of the Kalman filter. More specifically, the input consists of:

the internal matrices of the Kalman filter: design, weights, covariance and transition matrices,
the quadratic sum of the residuals vector for each measurement type.

Thus, the device of the present disclosure is autonomous, as the error bound can be computed without any external information about the statistical nature of the measurement errors.

The next paragraphs describe a preferred way of the device and method of the present invention, which provides a bound, up to a confidence level $1-\alpha$, of the error in the estimation of the state vector of a physical system, TSV, by means of a Kalman filter with an estimation state vector KSV. Note that the KSV must contain the parameters of TSV, but can also contain additional parameters. For instance, in GNSS navigation the state vector TSV is usually the position of a GNSS receiver, while the Kalman filter that computes the navigation solution also includes the receiver velocity and the receiver clock bias and drift in the estimation state vector KSV.

The device of the present invention stores, for each measurement type m, the following variables:

a scalar $N_{G,m}$ and a square matrix $R_{G,m}$ having the same size as the Kalman state vector KSV, which defines a t-distribution $T_{G,m}$ to model the errors in the state vector estimation KSV due to errors in the measurements of type m accumulated during the Kalman process;

a matrix $A_m$ that is used to compute the effects of the temporal correlation of measurements. The columns of this matrix correspond to the parameters of the Kalman state vector KSV; each row is associated to a measurement that is repeated in successive epochs and shows temporal correlations. For instance, in the case of the GNSS navigation each row is associated to the different satellites being tracked by the receiver.

These variables are initialized as $N_{G,m}=1$, $R_{G,m}=0$ and $A_m=0$.

The device and method have two main parts, which are repeated at each epoch:
- update the value of the aforementioned variables;
- use them to compute a new error bound for the Kalman solution.

At each epoch, the Kalman filter processes a new set of measurements, of different types. As a result, a new solution of the estimated parameters is produced. Then, the device receives the following inputs from the Kalman filter:
- the design matrix $H_m$ of each measurements of type m at epoch $t_k$;
- the weight matrix $W_m$ used at epoch $t_k$ for each measurement type m;
- the covariance matrix P, updated with the measurements of epoch $t_k$;
- the deterministic transition matrix F from epoch $t_{k-1}$ to epoch $t_k$;
- the number $n_{OBS,m}$ of measurements of type m at epoch $t_k$; and
- the quadratic sum A, of the residuals vector $y_m$ of each measurement type m at epoch $t_k$, computed after the Kalman measurements update.

The first operation of the device and method at epoch $t_k$ is to compute a t-distribution $T_{L,m}$ which models the projection into the state vector estimate KSV of the errors of the measurements of type m in the current epoch. $T_{L,m}$ is defined by a scalar $N_{L,m}$ and a square matrix $R_{L,m}$. The LOCAL module produces $T_{L,m}$, as well as the measurements temporal correlation factor $0 \leq \rho_m < 1$, in two steps:

1. The OBS_QUALITY module delivers a scalar $n_m$ and a scalar $r_m$ that represent a t-distribution modelling a measurement error size, and a scalar $\rho_m$ that measures the temporal correlations. In the preferred embodiment, $\rho_m$ is a configuration parameter, $n_m$ is determined by the number of raw measurements $n_{OBS,m}$ minus the effective number of parameters estimated by the Kalman filter $d_{eff}$ and $r_m$ is the weighted RMS of the measurement residuals divided by $n_m$, where $d_{eff}$ is defined as the trace of the matrix $H_m K_m$ and $K_m = PH_m^T W_m$ is the Kalman gain matrix.
2. Using the previous values, $N_{L,m}$ and $R_{L,m}$ are derived by relations $N_{L,m}=n_m$ and $R_{L,m}=(r_m^2 K_m W_m^{-1} K_m^T)$, where $K_m$ is the Kalman gain matrix The second operation of the device and method at epoch $t_k$ is the update, for each measurement type m, of the variables $N_{G,m}$, $R_{G,m}$ and $A_m$. The module in charge of the operation is UPDATE and proceeds in several steps:
1. Propagate the value of $T_{G,m}$ by keeping $N_{G,m}$ unchanged and replacing the matrix $R_{G,m}$ by $(UR_{G,m}U^T)$, where $U=(1-\Sigma_m K_m H_m) \cdot F$.
2. Compute a cross-correlation matrix $D_m$ from the correlation state $A_m$ as $D_m = r_m K_m W_m A_m U^T$
3. Compute a new value of $T_{G,m}$ by using the MERGE module to merge $T_{L,m}$ and the current value of $T_{G,m}$ with cross-correlation parameters $D_m$. In order to merge two t-distributions $T_1$ and $T_2$ with correlation D into a new t-distribution T, MERGE performs several steps:
   a. Compute the updated value of R in T as the sum of the matrices $R_1$, $R_2$, D and the transpose matrix of D
   b. Compute the auxiliary variables $t_1$, $t_2$, by using the intermediate matrices Z, S:

$$Z = \omega \cdot (N_1 R_1 + N_2 R_2)$$

$$S = N_1 R_1 + N_2 R_2 + Z$$

$$t_1 = [N_1 tr(R_1)/tr(S)]^{1/2}$$

$$t_2 = [N_2 tr(R_2)/tr(S)]^{1/2}$$

The parameter $\omega > 1$ tunes the update of N, depending on the confidence level $1-\alpha$. For bigger confidence levels, it should be higher.

c. Compute the updated value of N in T by numerically solving the following equation:

$$N^{\frac{d-2}{2}} t^{2-d}(1+t^{-2})^{-\frac{N+d-2}{2}} = N_1^{\frac{d-2}{2}} t_1^{N_1} \exp\left\{\frac{(N_1+N_2)N_1}{2N_2} t_2^2\right\} + N_2^{(d-2)/2} t_2^{N_2} \exp\left\{\frac{(N_1+N_2)N_2}{2N_1} t_1^2\right\}$$

where the expression t represents the value $[Ntr(R)/tr(S)]^{1/2}$ and d is the size of vector TSV.

4. Compute a new value of $A_m$ as the sum of $r_m \rho_m W_m^{-1/2} K_m^T$ and $\rho_m A_m U^T$.

The final operation of the device and method at epoch $t_k$ is the computation of the bound $B(\alpha)$ for this epoch. It also consists of several steps:
1. For each measurement type m, compute the trace $tr_m$ of the matrix $R_{G,m}$ over the parameters of TSV.
2. For each measurement type m, compute the factor $b_m$ as $$b_m = [tr_m/d]^{1/2}$$

As mentioned above, d is the size of TSV.

3. For each measurement type m, compute the factor $k(\alpha, N_{G,m})$ by numerically solving the equation $$\frac{2}{B(d/2, N_{G,m}/2)} \int_k^\infty \frac{y^{d-1}}{(1+y^2)^{(N_{G,m}+d)/2}} dy = \alpha$$

4. For each measurement type m, compute bound $B_m(\alpha)$ as $$B_m(\alpha) = k(\alpha, N_m) \cdot b_m$$

5. Finally, compute the total bound $B(\alpha)$ as the sum of the partial ones:

$$B(\alpha) = \Sigma_m B_m(\alpha)$$

Once the general device and method have been presented, the next paragraphs describe a reduced implementation for the GNSS navigation with pseudorange and Doppler measurements. In this case, the matrices $R_m$ are 2×2, even if the Kalman state vector is much bigger. The two components correspond to the position and velocity errors, respectively. The goal is to provide bounds for the horizontal position error (that is, d=2). In this specific case, the device and method store, for each measurement type m (pseudorange and Doppler), the following variables:
- a scalar $N_{G,m}$ and a 2×2 matrix $R_{G,m}$;
- a two-dimensional vector $A_m$ used to compute the effects of the temporal correlation of measurements.

These variables are initialized as $N_{G,m}=1$, $R_{G,m}=0$, $A_m=0$.

At each epoch, the Kalman filter processes a new set of pseudorange and Doppler measurements. As a result, a new solution of the estimated parameters is produced, and thus a new position. The device and method receive the same inputs from the Kalman filter as mentioned above, for pseudorange and Doppler measurements.

The first operation of the device and method at epoch $t_k$ is to compute a t-distribution $T_{L,m}$ which models the projection into the state vector estimate KSV of the errors of the measurements of type m in the current epoch. $T_{L,m}$ is defined by a scalar $N_{L,m}$ and a 2×2 matrix $R_{L,m}$. The LOCAL module produces $T_{L,m}$, as well as the measurements temporal correlation factor $0 \leq \rho_m < 1$, in two steps:

1. The OBS_QUALITY module delivers a scalar $n_m$ and a scalar $r_m$ that represent a t-distribution modelling a measurement error size, and a scalar $\rho_m$ that measures the temporal correlations. $\rho_m$ is a configuration parameter, $n_m$, is determined by the number of raw measurements $n_{OBS,m}$ minus the effective number of parameters estimated by the Kalman filter $d_{eff}$ and $r_m$ is the weighted RMS of the measurement residuals divided by $n_m$, where $d_{eff}$ is defined as the trace of the matrix $H_m K_m$ and $K_m = PH_m^T W_m$ is the Kalman gain matrix.
2. Using the previous values, $N_{L,m}$ and $R_{L,m}$ are derived by relations $N_{L,m} = n_m$ and $$\mu_{m,A} = r_m^2 tr_{PP}(K_m W_m^{-1} K_m^T)/2$$
$$\mu_{m,C} = r_m^2 tr_{PV}(K_m W_m^{-1} K_m^T)/2$$
$$\mu_{m,B} = r_m^2 tr_{VV}(K_m W_m^{-1} K_m^T)/2$$
$$R_{L,m} = \begin{pmatrix} \mu_{m,A} & \mu_{m,C} \\ \mu_{m,C} & \mu_{m,B} \end{pmatrix}$$

where $tr_{PP}$ is the trace over the block of the matrix whose rows and columns correspond to horizontal position parameters, $tr_{VV}$ is the trace over the block of the matrix whose rows and columns correspond to horizontal velocity parameters and $tr_{PV}$ is the trace over the block of the matrix whose rows correspond to horizontal position parameters and whose columns correspond to horizontal velocity parameters.

The second operation of the device and method at epoch $t_k$ is the update, for each measurement type m, of the variables $N_{G,m}$, $R_{G,m}$, and $A_m$. The module in charge of the operation is UPDATE and proceeds in several steps:

1. Propagate the value of $T_{G,m}$ by keeping $N_{G,m}$ unchanged and replacing the matrix $R_{G,m}$ by $\overline{U} R_{G,m} \overline{U}^T$, where $$\overline{U} = \frac{1}{2}\begin{pmatrix} tr_{PP}(U) & tr_{PV}(U) \\ tr_{VP}(U) & tr_{VV}(U) \end{pmatrix} \text{ and } U = \left(1 - \sum_m K_m H_m\right) \cdot F.$$

2. Compute a cross-correlation matrix $D_m$ from the correlation state $A_m$ as $\overline{U} A_m (\mu_{m,A}^{1/2} \ \mu_{m,B}^{1/2})$
3. Compute a new value of $T_{G,m}$ by using the MERGE module to merge $T_{L,m}$ and the current value of $T_{G,m}$ with cross-correlation parameters $D_m$. In order to merge two t-distributions $T_1$ and $T_2$ with correlation D into a new t-distribution T, MERGE performs several steps:
   a. Compute the updated value of R in T as the sum of the matrices $R_1$, $R_2$, D and the transpose matrix of D
   b. Compute the auxiliary variables $t_1$, $t_2$, by using the intermediate matrices Z, S:

$$Z = \omega \cdot (N_1 R_1 + N_2 R_2)$$
$$S = N_1 R_1 + N_2 R_2 + Z$$
$$t_1 = [N_1 tr(R_1)/tr(S)]^{1/2}$$
$$t_2 = [N_2 tr(R_2)/tr(S)]^{1/2}$$

The parameter $\omega > 1$ tunes the update of N, depending on the confidence level $1-\alpha$. For bigger confidence levels, it should be higher.

c. Compute the updated value of N in T by numerically solving the following equation:

$$(1+t^{-2})^{-N/2} = t_1^{N_1} \exp\left\{\frac{(N_1+N_2)N_1}{2N_2}t_2^2\right\} + t_2^{N_2} \exp\left\{\frac{(N_1+N_2)N_2}{2N_1}t_1^2\right\}$$

where the expression t represents the value $[N tr(R)/tr(S)]^{1/2}$.

4. Compute a new value of $A_m$ as the sum of $\rho_m(\mu_{m,A}^{1/2} \ \mu_{m,B}^{1/2})^T$ and $\rho_m \overline{U} A_m$.

The final operation of the device and method at epoch $t_k$ is the computation of the bound $B(\alpha)$ for this epoch. It also consists of several steps:

1. For each measurement type m, compute the factor $k(\alpha, N_{G,m})$ as $$k(\alpha, N_m) = N_m^{1/2} \cdot (\alpha^{-2/N} - 1)^{1/2}$$

2. For each measurement type m, compute bound $B_m(\alpha)$ as $$B_m(\alpha) = k(\alpha, N_m) \cdot (R_{G,m})_{11}^{1/2}$$

3. Finally, compute the total bound $B(\alpha)$ as the sum of the partial ones:

$$B(\alpha) = \Sigma_m B_m(\alpha)$$

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A global navigation satellite system (GNSS) unit for providing a position solution together with bound B of a position error, the GNSS unit comprising:
   a Kalman filter for computing the position solution and a device for computing the error bound B up to a confidence level $1-\alpha$, of the error in an estimation vector KSV of a state vector of a GNSS receiver as provided by the Kalman filter, the Kalman filter receiving from the GNSS receiver multiple raw measurements $RM_m$ of different types, m denoting each measurement type, the Kalman filter providing the following outputs:
   the number $n_{OBS,m}$ of raw measurements of type m;
   a design matrix $H_m$ for measurements of type m;
   a weight matrix $W_m$ used for measurements of type m;
   the vector of residuals $y_m$ of the measurements of type m, computed after the Kalman measurements update;
   a covariance matrix P of the error made in the estimation KSV of the state vector;
   a transition matrix F defining the evolution of the state vector; and
   wherein the device further comprises:
   an OBS_QUALITY module, receiving measurements indicators from the GNSS receiver and the outputs from the Kalman filter, and delivering a quality indicator for each measurement type m, the quality indicator being defined by two parameters, a scalar $n_m$ and a scalar $r_m$ that represent a t-distribution modelling a measurement error size, and a correlation parameter $\rho_m$, a scalar that measures the temporal correlations;

a LOCAL module, receiving the parameters $n_m$ and $r_m$ delivered by the OBS_QUALITY module and the outputs from the Kalman filter, and delivering a set of error parameters $T_{L,m}$ for each measurement type m comprising a scalar $N_{L,m}$ and a symmetric matrix $R_{L,m}$ of same size as the vector KSV, which parameters represent a t-distribution associated to the projection into the state vector estimate KSV of the errors of the measurements of type m in the current epoch, the said module using the relations $N_{L,m}=n_m$ and $R_{L,m}=(r_m^2 K_m W_m^{-1} K_m^T)$, where $K_m=PH_m^T W_m$;

a MERGE module, receiving two sets of error parameters $T_1$, $T_2$ and a cross-correlation matrix D of same size as the vector KSV, and delivering a merged set of error parameters T which represents the error distribution of the sum of the variables modelled by $T_1$ and $T_2$ assuming a cross-correlation given by D;

an UPDATE module, receiving the correlation parameter $\rho_m$, from the OBS_Quality modules the set of error parameters $T_{L,m}$ computed by the LOCAL module and the outputs from the Kalman filter, and updating the value of an internal state by defining:

a set of error parameters $T_{G,m}$ for each measurement type m, comprising a scalar $N_{G,m}$ and a symmetric matrix $R_{G,m}$ of same size as the vector KSV, which parameters represent a t-distribution associated to the errors in the state vector estimate KSV due to errors in the measurements of type m;

a correlation state $A_m$ for each measurement type m given by a matrix containing a row for each measurement and a column for each parameter of the state vector estimation KSV, which matrix represents the expected degree of correlation between measurements and estimated parameters;

this UPDATE module being configured for:

propagating the value of $T_{G,m}$ by keeping $N_{G,m}$ unchanged and replacing the matrix $R_{G,m}$ by $(UR_{G,m} U^T)$, where $U=(1-\Sigma_m K_m H_m)\cdot F$;

producing a cross-correlation matrix $D_m$ from the correlation state $A_m$ as $D_m = r_m K_m W_m^{-1/2} A_m U^T$;

producing a new value of $T_{G,m}$ by using the MERGE module to merge $T_{L,m}$ and the current value of $T_{G,m}$ with cross-correlation parameters $D_m$;

producing a new value of $A_m$ as the sum of $r_m \rho_m W_m^{-1/2} K_m^T$ and $\rho_m A_m U^T$;

a SINGLE—BOUND module, receiving a set of error parameters T and the confidence level $1-\alpha$, and delivering an error bound B for a fixed subset of parameters of KSV, which error bound is determined in that the probability of the norm of the error of the selected subset of parameters being below B is at least $1-\alpha$ when computed with the t-distribution associated to the parameters T; and, a TOTAL_BOUND module, receiving the set of error parameters $T_{G,m}$ and the confidence level $1-\alpha$, configured for computing the error bound B for a fixed subset of parameters of KSV by:

i) computing an error bound $B_m$ for each measurement type m by applying the SINGLE_BOUND module on $T_{G,m}$ and adding all the error bounds $B_m$; or, ii) merging the different $T_{G,m}$ into a single set of parameters T by using the MERGE module and computing error bound B by applying SINGLE_BOUND on T;

wherein the GNSS unit provides the position solution and the error bound B of the position solution, the position solution and the error bound B being used to provide a position with integrity in an application of GNSS navigation.

2. The global navigation satellite system (GNSS) unit according to claim 1, wherein the OBS_QUALITY module receives for each measurement type m the outputs from the Kalman filter, delivering the parameter $\rho_m$ which is a configuration parameter, $n_m$ which is determined by the number of raw measurements $n_{OBS,m}$ minus the effective number of parameters estimated by the Kalman filter $d_{eff}$ and $r_m$ which is the weighted RMS of the measurement residuals divided by $n_m$, where $d_{eff}$ is defined as the trace of the matrix $H_m K_m$.

3. The global navigation satellite system (GNSS) unit according to claim 1, wherein the MERGE module calculates the error parameter R of T as the sum of the matrices $R_1$, $R_2$, D and the transpose matrix of D, and N of T is obtained by numerically solving the following equation:

$$N^{(d-2)/2} t^{2-d}(1+t^{-2})^{-(N+d-2)/2} =$$
$$N_1^{(d-2)/2} t_1^{N_1} \exp\left\{\frac{(N_1+N_2)N_1}{2N_2} t_2^2\right\} + N_2^{(d-2)/2} t_2^{N_2} \exp\left\{\frac{(N_1+N_2)N_2}{2N_1} t_1^2\right\}$$

where:

d is the number of parameters that shall be bound,
$t_1=[N_1 tr(R_1)/tr(S)]^{1/2}$
$t_2=[N_2 tr(R_2)/tr(S)]^{1/2}$
$t=[N tr(R)/tr(S)]^{1/2}$
$S=N_1 R_1 + N_2 R_2 + Z$
$Z=\cap \cdot (N_1 R_1 + N_2 R_2)$, $\omega$ being a fine tuning parameter that depends on the confidence level $1-\alpha$.

4. The global navigation satellite system (GNSS) unit according to claim 1, wherein the MERGE module calculates the error parameter R of T as the sum of the matrices $R_1$, $R_2$, D and the transpose matrix of D, and N of T is obtained as:

$$N = tr(R) \cdot [\omega \cdot (a_1 + a_2) + 4 a_1 a_2] \cdot \left[\omega \cdot \left(\frac{a_1}{N_1} + \frac{a_2}{N_2}\right) + 4 \frac{a_1 a_2}{N_1 + N_2}\right]^{-1}$$

where $\alpha_1 = tr(R_1)$, $\alpha_2 = tr(R_2)$ and co is a fine tuning parameter that depends on the confidence level $1-\alpha$.

5. The global navigation satellite system (GNSS) unit according to claim 1, wherein the SINGLE_BOUND module delivers the error bound B for a set of error parameters T by applying $B = k(\alpha, N) \cdot b$, where:

$k(\alpha, N)$ is computed by numerically solving the equation $$\frac{2}{B(d/2, N/2)} \int_k^\infty \frac{y^{d-1}}{(1+y^2)^{(N+d)/2}} dy = 1 - \alpha$$

d is the number of parameters of the state vector KSV that shall be bound,
$b=[\tau/d]^{1/2}$,
$\tau$ is the trace of R taken over the d parameters that shall be bound.

6. The global navigation satellite system (GNSS) unit according to claim 5, wherein $k(\alpha,N)$ is computed as $$\left(\frac{dN}{2}\right)^{1/2} \cdot ((\alpha)^{-2/N} - 1)^{1/2}.$$

7. The global navigation satellite system (GNSS) unit according to claim 1, wherein the sets of error parameters consist of scalars N and R and the correlation states $A_m$ are also scalar, whereby:
the LOCAL module uses the reduction $R_{L,m} = r_m^2 \cdot [\text{tr}(K_m W_m^{-1} K_m^T)/d]$
the UPDATE module propagates $R_{G,m}$ as $\lambda^2 \cdot R_{G,m}$, where $\lambda = \text{tr}(U)/d$,
the UPDATE module uses $R_{L,m}^{1/2} \cdot \lambda \cdot A_m$ for $D_m$,
the UPDATE module updates $A_m$ as the sum of $\rho_m R_{L,m}^{1/2}$ and $\rho_m A_m \lambda$, the previous traces being taken over the d parameters that shall be bounded.

8. The global navigation satellite system (GNSS) unit according to claim 1, wherein the Kalman filter state includes estimates of the time derivatives of the parameters to be bounded, the sets of error parameters contain a scalar N and a 2×2 matrix R and the correlation state $A_m$ is a two-dimensional vector, whereby:
the LOCAL module uses the reduction $$R_{L,m} = \begin{pmatrix} \mu_{m,A} & \mu_{m,C} \\ \mu_{m,C} & \mu_{m,B} \end{pmatrix},$$

where:
$\mu_{m,A} = r_m^2 \, \text{tr}_{PP}(K_m W_m^{-1} K_m^T)/d$
$\mu_{m,C} = r_m^2 \, \text{tr}_{PV}(K_m W_m^{-1} K_m^T)/d$
$\mu_{m,B} = r_m^2 \, \text{tr}_{VV}(K_m W_m^{-1} K_m^T)/d$
$\text{tr}_{PP}$ is the trace over the block of the matrix whose rows and columns correspond to parameters to be bounded, $\text{tr}_{VV}$ is the trace over the block of the matrix whose rows and columns correspond to time derivatives of parameters to be bounded and $\text{tr}_{PV}$ is the trace over the block of the matrix whose rows correspond to parameters to be bounded and whose columns correspond to time derivatives of parameters to be bounded:
the UPDATE module propagates $R_{G,m}$ as $\overline{U} R_{G,m} \overline{U}^T$, where $$\overline{U} = \frac{1}{d}\begin{pmatrix} tr_{PP}(U) & tr_{PV}(U) \\ tr_{VP}(U) & tr_{VV}(U) \end{pmatrix};$$

the UPDATE module uses $\overline{U} A_m (\mu_{m,A}^{1/2} \, \mu_{m,B}^{1/2})$ for $D_m$,
the UPDATE module updates $A_m$ as the sum of $\rho_m (\mu_{m,A}^{1/2} \, \mu_{m,B}^{1/2})^T$ and $\rho_m \overline{U} A_m$.

9. The global navigation satellite system (GNSS) unit according to claim 1, wherein an additional measurement label is included to consider errors in a set of parameters X not estimated in the Kalman filter but affecting the measurements, wherein:
the output of the OBS_QUALITY module is provided by an external interface;
the Kalman inputs to the LOCAL module are a weight matrix $W_X$ provided by an external interface and a design matrix $H_X$ computed as $W_X^{-1} \Sigma_m J_m^T W_m H_m$, where the sum runs over the measurement types m, and $J_m$ is the design matrix containing the dependence of measurements of type m on the set of parameters X.

10. The global navigation satellite system (GNSS) unit according to claim 1, wherein the fixed subset of parameters of the estimation vector KSV to be bounded are the horizontal components of the position error, and wherein the measurement types m are two or more of pseudorange measurements, Doppler measurements, carrier-phase measurements.

11. The global navigation satellite system (GNSS) unit according to claim 1, wherein the fixed subset of parameters of the estimation vector KSV to be bounded are the vertical components of the position error and/or the horizontal and/or the vertical components of the velocity error.

12. Method for providing a position solution together with a bound B of a position error, the method comprising:
computing the position solution and the error bound B up to a confidence level $1-\alpha$, of an error in an estimation vector KSV of a state vector TSV of a GNSS receiver as provided by a Kalman filter, the Kalman filter receiving from the GNSS receiver multiple raw measurements $RM_m$ of different types, m denoting each measurement type, the Kalman filter also providing the following outputs:
the number $n_{OBS,m}$ of raw measurements of type m;
a design matrix $H_m$ for measurements of type m;
a weight matrix $W_m$ used for measurements of type m;
the vector of residuals $y_m$ of the measurements of type m, computed after the Kalman measurements update;
a covariance matrix P of the error made in the estimation KSV of the state vector; and
a transition matrix F defining the evolution of the state vector;
wherein the method comprises the steps of:
computing a t-distribution $T_m$ for each measurement type m, each t-distribution $T_m$ being defined by a scalar $N_m$ and a matrix $R_m$, which t-distribution is obtained using a fitting method which adjusts the t-distribution $T_m$ to the sum of two t-distributions $T_{m1}$ and $T_{m2}$,
the first t-distribution $T_{m1}$ corresponding to the projection on the state vector estimation KSV of the errors of the measurements of type m in the current epoch, and being defined by a scalar $N_{m1}$ and a matrix $R_{m1}$ that are computed as follows: $N_{m1} = n_m + \beta N_{m1}'$ and $R_{m1} = (r_m^2 K_m W_m^{-1} K_m^T)$,
where:
$n_m = n_{OBS,m} - \text{tr}(H_m K_m)$;
$r_m^2 = (y_m^T W_m y_m + \beta N_{m1}'(r_m')^2)/N_{m1}$;
$N_{m1}'$, $r_m'$ are the values of $N_{m1}$, $r_m$, respectively, at the previous epoch $t_{k-1}$;
$\beta$ is a tuning parameter between 0 and 1, given as input to the method;
$K_m = P H_m^T W_m$;
the second t-distribution $T_{m2}$ corresponding to the projection on the state vector estimation KSV of the errors of the measurements of type m accumulated in previous epochs, and being defined by a scalar $N_{m2}$ and a matrix $R_{m2}$ that are computed by propagating the previous value of $T_m$ as follows: $N_{m2} = N_m'$ and $R_{m2} = (U R_m' U^T)$,
where
$N_m'$, $R_m'$ are the values of $N_m$, $R_m'$, respectively, at the previous epoch $t_{k-1}$;
$U = (1 - \Sigma_m K_m H_m) \cdot F$;
computing the error bound B by:
i) computing a partial error bound $B_m$ for each t-distribution $T_m$ and adding the partial error bounds; or, ii) applying the previous step to a reduced number of t-distributions obtained from the t-distributions $T_m$ by applying the fitting method successively to pairs of t-distributions $T_m$;

wherein the position solution and the error bound B are used to provide a position with integrity in an application of GNSS navigation.

13. Method according to claim 12, wherein the method further comprises:

computing a mutual correlation matrix $D_m$ of the two t-distributions $T_{m1}$ and $T_{m2}$ as follows:

$$D_m = r_m K_m W_m^{-1/2} A_m U^T$$

where $A_m$ is a matrix that has a row for each measurement of type m and a column for each parameter of the state vector estimation KSV;

subtracting a correction term computed as $tr(\rho_m H_m K_m)$ to the value of $n_m$; and, computing a new value of $A_m$ for the next epoch $t_{k+1}$, as the sum of $r_m \cdot \rho_m W_m^{-1/2} K_m^T$ and $\rho_m A_m' U^T$, where $\rho_m$ is a diagonal matrix whose entries are correlation factors $0 \leq (\rho_m)_{ii} < 1$, and $A_m'$ is the old value of $A_m$.

14. Method according to claim 13, wherein the parameter $R_m$ is calculated as follows: $R_m = R_{m1} + R_{m2} + D_m + D_m^T$.

15. Method according to claim 12, wherein the fitting method which adjusts the sum of two t-distributions $T_{m1}$ and $T_{m2}$ to the t-distribution $T_m$ comprises calculating the defining parameters $N_m$ and $R_m$ of $T_m$ as follows:

$R_m = R_{m1} + R_{m2}$; and, $N_m$ by numerically solving the following equation:

$$N_m^{(d-2)/2} t_m^{2-d} (1 + t_m^{-2})^{-(N_m+d-2)/2} =$$
$$N_{m1}^{(d-2)/2} t_{m1}^{N_{m1}} \exp\left\{\frac{(N_{m1} + N_{m2})N_{m1}}{2N_{m2}} t_{m2}^2\right\} +$$
$$N_{m2}^{(d-2)/2} t_{m2}^{N_{m2}} \exp\left\{\frac{(N_{m1} + N_{m2})N_{m2}}{2N_{m1}} t_{m1}^2\right\}$$

where:

d is the size of the state vector TSV,
$t_{m1} = [N_{m1} tr(R_{m1})/tr(S)]^{1/2}$
$t_{m2} = [N_{m2} tr(R_{m2})/tr(S)]^{1/2}$
$t_m = [N_m tr(R_m)/tr(S)]^{1/2}$
$S = N_{m1} R_{m1} + N_{m2} R_{m2} + Z$
$Z = \omega \cdot (N_{m1} R_{m1} + N_{m2} R_{m2})$, a) being a fine tuning parameter that depends on the confidence level $1-\alpha$.

16. Method according to claim 12, wherein the fitting method which adjusts the sum of two t-distributions $T_{m1}$ and $T_{m2}$ to the t-distribution $T_m$ comprises calculating the defining parameters $N_m$ and $R_m$ of $T_m$ as follows:

$$R_m = R_{m1} + R_{m2}; \text{ and,}$$

$$N_m = tr(R_m) \cdot [\omega \cdot (a_1 + a_2) + 4a_1 a_2] \cdot \left[\omega \cdot \left(\frac{a_1}{N_{m1}} + \frac{a_2}{N_{m2}}\right) + 4\frac{a_1 a_2}{N_{m1} + N_{m2}}\right]^{-1}$$

where $a_1 = tr(R_{m1})$, $a_2 = tr(R_{m2})$ and $\omega$ is a fine tuning parameter that depends on the confidence level $1-\alpha$.

17. Method according to claim 12, wherein the partial error bound $B_m$ for a t-distribution $T_m$ is computed as follows:

$$B_m(\alpha) = k(\alpha, N_m) \cdot b_m$$

where:

$k(\alpha, N_m)$ is computed by numerically solving the equation $$\frac{2}{B(d/2, N_m/2)} \int_k^\infty \frac{y^{d-1}}{(1+y^2)^{(N_m+d)/2}} dy = 1 - \alpha$$

d is the size or the number of parameters of the state vector TSV, $b_m = [\tau_m/d]^{1/2}$, $\tau_m$ is the trace of $R_m$ taken over the d parameters of the state vector TSV, $(N_m, R_m)$ being the defining parameters of the t-distribution $T_m$.

18. Method according to claim 17, wherein if the size of the state vector TSV is 2, $k(\alpha, N)$ is computed as $N_m^{1/2} \cdot (\alpha^{-2/N} - 1)^{1/2}$.

19. Method according to claim 12, wherein the matrices $R_m$ can be simplified to numbers and obtained as:
$R_{m1} = r_m^2 \cdot [tr(K_m W_m^{-1} K_m^T)/d]$
$R_{m2} = \lambda^2 \cdot R_m'$, where $R_m'$ is the value of $R_m$ at the previous epoch $t_{k-1}$,
$\lambda = tr(U)/d$,
the traces being taken over the d parameters of the state vector TSV; and, if temporal correlations are considered the variables $D_m$ and $A_m$ are numbers, and $D_m$ is computed as $R_{m1}^{1/2} \cdot \lambda \cdot A_m$,
$A_m$ is updated as the sum of $\rho_m R_{m1}^{1/2}$ and $\rho_m A_m' \lambda$, where $\rho_m$ is a correlation factor $0 \leq \rho_m < 1$ given as input and $A_m'$ is the old value of $A_m$.

* * * * *